United States Patent [19]
Hettrick

[11] 3,898,132
[45] Aug. 5, 1975

[54] METHOD OF PREPARING STOWABLE, DORMANT BACTERIA

[75] Inventor: La Verne A. Hettrick, Salinas, Calif.

[73] Assignee: International Feed Improvement Association, Inc., Carson City, Nev.

[22] Filed: Aug. 24, 1972

[21] Appl. No.: 283,566

[52] U.S. Cl. .................... 195/65; 71/6; 195/52; 195/104; 195/110; 195/56
[51] Int. Cl.² ............................................ C12K 1/08
[58] Field of Search ........ 195/59, 54, 116, 56, 110, 195/100, 96, 98, 104; 426/61, 52, 62, 56; 71/6, 7, 8, 9, 10

[56] References Cited
UNITED STATES PATENTS

| | | | |
|---|---|---|---|
| 2,938,794 | 5/1960 | Herman | 195/56 |
| 3,168,796 | 2/1965 | Scott et al. | 195/59 |
| 3,242,073 | 3/1966 | Guebert et al. | 210/75 |

OTHER PUBLICATIONS

Frobisher, Fundamentals of Microbiology, W. B. Saunders Co., (1968), pp. 50–55.

*Primary Examiner*—Lionel M. Shapiro
*Assistant Examiner*—Thomas G. Wiseman
*Attorney, Agent, or Firm*—Kolisch, Hartwell, Dickinson & Stuart

[57] ABSTRACT

A method of establishing reversible dormancy in a population of active microorganisms. The method entails producing a wet mixture containing, along with such population, a liquid carrier and diatomaceous earth particles.

3 Claims, No Drawings

METHOD OF PREPARING STOWABLE, DORMANT BACTERIA

BACKGROUND, SUMMARY AND DETAILED DESCRIPTION OF THE INVENTION

This invention pertains to the processing of active microorganisms, and more particularly to a method of establishing reversible dormancy in such organisms.

Various kinds of microorganisms are employed today for many different beneficial purposes. For example, some kinds, such as those derived from the excreta or rumen contents of certain animals, are used, among other things, as constitutents in so-called soil improvers. Many other specific uses of microorganisms are, of course, known.

A problem heretofore, however, has been the difficulty of successfully and economically storing such organisms over extended periods of time in a condition ready for use.

A general object of the present invention, therefore, is to provide a novel method of preparing different kinds of microorganisms for satisfactory long-term storage.

More specifically, an object of the invention is to provide such a method whereby microorganisms can easily be placed in a state of reliable reversible dormancy, out of which the organisms may be reactivated at any selected later time.

These highly desirable objectives are readily attained by the method of the present invention which contemplates the very simple yet unique procedure of preparing a wet mixture containing, essentially, and in particular critical proportions, three constitutents: a population of the desired microorganisms, a suitable liquid carrier (such as water or oil or another), and particles of diatomaceous earth. This procedure is applicable to any type of microorganism.

The relevant proportions of the above constitutents which must be maintained for successful practice of the invention are as follows: in the final mixture, the weight of diatomaceous earth particles must be in the range of about 25 percent to about 400 percent of the weight of the liquid carrier in the mixture; and, the weight of the microorganisms should not exceed about 15 percent of the total weight of the mixture. With respect to the relative proportions of diatomaceous earth particles and a liquid carrier, a very satisfactory, and preferred, relationship is one where the weight of the particles is about 65–70 percent of the weight of the carrier.

On preparation of a mixture as above described, the active microorganisms therein become dormant, but reactivatable at any later time. By enclosing the prepared mixture in a suitable moisture-impervious sealed container, such as a sealed plastic pail or tub, to maintain the moisture content of the mixture substantially constant, the microorganisms can be held in reversible dormancy indefinitely. Reactivation is accomplished simply by unsealing the mixture, and increasing the amount of liquid carrier therein to where the carrier has a weight greater than four times that of the diatomaceous earth particles.

By way of example, a population of microorganisms contained in animal excreta, and intended for later use as a plant and soil nourisher, is successfully made dormant for long-term storage purposes in the following manner. One-quarter pound of fresh manure, along with one-quarter pound of fresh urine from a heifer are blended into 100 lbs. of water (liquid carrier). This blend is then allowed to sit in a tank for a period of about 4 days—such sitting allowing the natural assimilation into the water of microorganisms from the manure and urine. After this period, the liquid and solid constituents of the blend are suitably separated as by siphoning off the former. Sixty-seven lbs. of commercially available diatomaceous earth particles are then added to this separated liquid constituent to produce the final mixture. Such diatomaceous earth is normally powder-like in form, and typically contains particles having mesh sizes in the range of about 200–400 mesh.

This final mixture, it will be noted, contains less than 15 percent (by weight) of microorganisms (from the manure and urine). Further, the weight of the diatomaceous earth particles in the mixture is about 67 percent of the weight of the water therein. Thus, the mixture fits the criteria set forth above. Consequently, and as is desired, the manure-carried and urine-carried microorganisms which have been assimilated in the water become dormant in the mixture.

For long-term storage purposes, the mixture is sealed in a moisture-impervious plastic container. Such sealing maintains the moisture content of the mixture substantially constant, and thereby maintains a state of dormancy in the microorganisms. This state can be held indefinitely.

When it is desired to reactivate the microorganisms for use, this is done simply by opening the container, and by then adding the mixture to enough new water whereby the combined weight of the original water in the mixture, plus the new water, is greater than four times that of the diatomaceous earth particles in the mixture.

The present invention, thus, affords a simple method of establishing reversible dormancy in microorganisms. Within the limits defined above, it is apparent that various specific storeable mixtures, wherein microorganic dormancy is attained, can be prepared in accordance with the steps of the invention. Any suitable liquid carrier may be used.

It is claimed and desired to secure by letters patent:

1. A method of establishing reversible dormancy in a population of active microorganisms, said method comprising preparing a mixture containing said population along with a liquid carier and diatomaceous earth particles, said population comprising up to about 15 percent by weight of said mixture, and said particles having a weight in the mixture in the range of about 25-400 percent of the weight of the liquid carrier.

2. The method of claim 1, which further is for preserving for an indefinite time dormancy in said population, and which to this end further comprises maintaining substantially constant the moisture content in the mixture.

3. The method of claim 2, wherein said maintaining is accomplished by enclosing said mixture in a moisture-impervious container.

* * * * *